(12) United States Patent
Sennhauser et al.

(10) Patent No.: US 10,474,700 B2
(45) Date of Patent: Nov. 12, 2019

(54) ROBUST STREAM FILTERING BASED ON REFERENCE DOCUMENT

(71) Applicant: Nektoon AG, Zürich (CH)

(72) Inventors: Alexander Sennhauser, Zürich (CH); Felix Hürlimann, Zürich (CH)

(73) Assignee: NEKTOON AG, Zürich (CH)

( * ) Notice: Subject to any disclaimer, the term of this patent is extended or adjusted under 35 U.S.C. 154(b) by 1036 days.

(21) Appl. No.: 14/617,162

(22) Filed: Feb. 9, 2015

(65) Prior Publication Data

US 2015/0227515 A1  Aug. 13, 2015

Related U.S. Application Data

(60) Provisional application No. 61/938,293, filed on Feb. 11, 2014.

(51) Int. Cl.
*G06F 16/31* (2019.01)
*G06F 16/35* (2019.01)

(52) U.S. Cl.
CPC ............ *G06F 16/313* (2019.01); *G06F 16/35* (2019.01)

(58) Field of Classification Search
CPC ......... G06F 17/30616; G06F 17/30705; G06F 16/313; G06F 16/35
See application file for complete search history.

(56) References Cited

U.S. PATENT DOCUMENTS

| | | | |
|---|---|---|---|
| 5,920,854 A * | 7/1999 | Kirsch | G06F 17/30616 |
| 6,105,023 A * | 8/2000 | Callan | G06F 17/30622 |
| 6,996,575 B2 * | 2/2006 | Cox | G06F 17/30705 707/739 |
| 7,548,910 B1 * | 6/2009 | Chu | G06F 17/30616 |
| 8,180,717 B2 * | 5/2012 | King | G06F 17/30705 706/20 |
| 8,271,266 B2 * | 9/2012 | Gallagher | G06F 17/27 345/169 |
| 8,340,957 B2 * | 12/2012 | Gallagher | G06F 17/30616 704/1 |

(Continued)

OTHER PUBLICATIONS

Dorian Selz et al.: "Unearth Gold in Landfills of Digital Data", Jan. 28, 2014, pp. 1-8, XP055174300. Internet. Qlik Community, http://community.qlik.com/docs/DOC-5781 Retrieved from the Internet: URL:http://community.qlik.com/servlet/JiveServlet/previewBody/5781-102-1-6993/SQ+-+EN+-+WP+-+Unearth+Gold+in+Landfills+of+Digital+Data.pdf [retrieved on Mar. 5, 2015] pp. 4-7.

(Continued)

*Primary Examiner* — Robert W Beausoliel, Jr.
*Assistant Examiner* — Susan F Rayyan

(57) ABSTRACT

A document stream filtering system includes computing hardware which is operable to execute one or more software products recorded on machine-readable data storage media. The computing hardware is operable to receive and store one or more documents of a document stream in a search index, receive one or more reference documents, calculate global document frequencies for the one or more documents of the document stream, generate a set of relevant terms and corresponding weights, generate a query by classifying the relevant terms into first and second categories, retrieve one or more documents from the search index based on the query, and filter the one or more retrieved documents based on a cut-off score.

12 Claims, 10 Drawing Sheets

(56) References Cited

U.S. PATENT DOCUMENTS

| | | | | |
|---|---|---|---|---|
| 8,504,550 | B2* | 8/2013 | Hall | H04L 51/32 707/710 |
| 8,589,399 | B1* | 11/2013 | Lee | G06F 17/30616 707/737 |
| 8,626,761 | B2* | 1/2014 | Kawai | G06F 17/30705 707/736 |
| 8,676,815 | B2* | 3/2014 | Deng | G06F 17/30705 707/749 |
| 8,713,024 | B2* | 4/2014 | Risvik | G06F 16/951 707/741 |
| 8,781,989 | B2* | 7/2014 | Duchon | G06F 17/30705 706/52 |
| 8,965,893 | B2* | 2/2015 | Cvet | G06F 17/3071 707/737 |
| 9,111,218 | B1* | 8/2015 | Lewis | G06N 5/04 |
| 9,256,649 | B2* | 2/2016 | Patton | G06F 17/3097 |
| 9,990,422 | B2* | 6/2018 | Chang | G06F 17/30705 |
| 2004/0230598 | A1* | 11/2004 | Robertson | G06F 17/30699 |
| 2005/0081139 | A1* | 4/2005 | Witwer | G06F 17/30705 715/234 |
| 2009/0037440 | A1* | 2/2009 | Will | G06F 17/3071 |
| 2010/0114899 | A1 | 5/2010 | Guha et al. | |
| 2012/0209830 | A1* | 8/2012 | Assodallahi | G06F 17/30643 707/722 |
| 2012/0311096 | A1* | 12/2012 | Hurley | H04L 67/06 709/219 |
| 2013/0339373 | A1* | 12/2013 | Patton | G06F 17/3053 707/749 |

OTHER PUBLICATIONS

International Search Report and Written Opinion of the International Searching Authority for the International Application No. PCT/EP2015/025003, dated Mar. 13, 2015, pp. 11.

International Preliminary Report on Patentability and Written Opinion for the International Application No. PCT/EP2015/025003, dated Aug. 9, 2016, pp. 8.

Communication Pursuant to Rules 161 (1) and 162 EPC for the European Application No. EP15704466.0 dated Sep. 27, 2016, pp. 2.

Communication Pursuant to Article 94 (3) EPC for the European Application No. EP15704466.0, dated Feb. 14, 2018, pp. 6.

* cited by examiner

ROBUST STREAM FILTERING BASED ON REFERENCE DOCUMENT

TECHNICAL FIELD

The present disclosure relates generally to information filtering systems, and more specifically, to a system and method for generating robust stream filters based on reference documents.

BACKGROUND

Information retrieval typically involves two parties. On one hand there are producers of the information to be stored by the information retrieval system. The producers either actively publish the information to the system or let the information system select the information from the producer's source system (e.g. internet search engines work that way). On the other hand there are consumers of the information stored in the information retrieval system. Consumers have a desire to locate information to satisfy their information need. Examples of published and stored information types, include, but are not limited to, digitized documents (e.g. scanned and converted with optical character recognition), electronic message documents (e-mails), images, HTML pages, binary documents such as office documents, and text documents.

Information retrieval systems extract information from a source document and store the corresponding document representation for later retrieval. Consumers of the system formulate queries which are formal statements of information need. The information retrieval system evaluates each query and locates matching document representations, with a varying level of relevance. The corresponding documents are returned to the user. The information retrieval system may also calculate the level of relevancy of each document representation and sort the returned documents according to the respective relevancy level.

One reason for the broad adoption of information retrieval systems is the large amount of digital information available. Technologies such as the public Internet, electronic messaging systems (e-mail), social media networks, and mobile devices allow producers to publish information more easily and thus more frequently. All of this results in an exponential growth of digital information. Many of today's digital information sources emit information continuously. Examples include electronic messaging systems (e-mail) and social media networks. Such sources create a continuous stream of information for the consumers to process. Thus, on the consumer side information overload is a wide spread problem—there is too much information to be processed. Consumers need tools to efficiently navigate through the information available and find the sub-set of information that satisfies their information need. To tackle such digital information streams more efficiently, consumers default to using an information filtering system.

SUMMARY

A document stream filtering system includes computing hardware which is operable to execute one or more software products recorded on machine-readable data storage media in order to receive and store one or more documents of a document stream in a search index, calculate global document frequencies for the one or more documents of the document stream, receive from a user terminal, one or more reference documents, generate a set of relevant terms and corresponding weights, using metrics of document frequencies of the one or more reference documents and the global document frequencies and generate a query by classifying the set of relevant terms into first and second categories using a clustering algorithm to identifying terms for each category based on the individual term weights.

In an embodiment of the present disclosure, the computing hardware is further operable to execute the one or more software products recorded on machine-readable data storage media in order to retrieve one or more documents from the search index when the one or more documents contain a term of the first category, arrange the one or more retrieved documents in a decreasing order of relevance based on the presence of terms of the second category and filter the one or more retrieved documents based on a cut-off score, wherein the filtered documents have a numeric score greater than or equal to the cut-off score.

In an embodiment of the present disclosure, the computing hardware is further operable to execute one or more software products recorded on machine-readable data storage media in order to cause extraction of valuable content text.

In an embodiment of the present disclosure, the operability to execute one or more software products recorded on machine-readable data storage media in order to cause extraction of valuable content text further includes operability to determine the document type and convert the document to text using the document type and a suitable converter component.

In an embodiment of the present disclosure, the operability to execute one or more software products recorded on machine-readable data storage media in order to cause the extraction of valuable content text further includes operability to segment the document text into text blocks, classify text blocks into valuable content and undesired content and extract text from valuable content blocks.

In an embodiment of the present disclosure, the operability to execute one or more software products recorded on machine-readable data storage media in order to cause classification of the relevant set of terms into first and second categories further includes operability to order the terms with decreasing term weight, initialize a clustering algorithm with individual term weights, execute the clustering algorithm to identify a single cluster which includes the top ranked term, assign the second category to each term if the single cluster does not contain the top ranked term, assign the second category to each term, if the single cluster contains more than N terms and assign the first category to the first M terms, if the single cluster contains less than N terms, and assigning the second category to the remaining terms.

In an embodiment of the present disclosure, the operability to execute one or more software products recorded on machine-readable data storage media in order to cause a query to be generated further includes operability to generate the input query by machine and evaluate the similarity of individual documents, compared to all documents in the stream.

In an embodiment of the present disclosure, the computing hardware is further operable to execute one or more software products recorded on machine-readable data storage media in order to filter the one or more retrieved documents according to respective timestamps.

In an embodiment of the present disclosure, the computing hardware is further operable to execute one or more software products recorded on machine-readable data storage media in order to notify a user about new matching documents.

In an embodiment of the present disclosure, the user terminal is implemented using at least one of: a personal computer, a laptop, a personal digital assistant, a tablet, a phablet a webpad, a wearable computer, a mobile telephone, a wrist-worn computer, and a smart phone.

In another aspect, embodiments of the present disclosure provide for a computer-implemented method for document stream filtering, which includes receiving and storing one or more documents of a document stream in a search index, calculating global document frequencies for the one or more documents of the document stream, receiving one or more reference documents from a user terminal, generating a set of weighted, relevant terms from document frequency metrics of both the reference documents and the global documents and generating an input query by classifying the set of weighted, relevant terms into first and second categories based on individual term weights.

In an embodiment of the present disclosure, the computer-implemented method also includes, retrieving the one or more documents when one or more documents of the search index contain a term of the first category, arranging the one or more retrieved documents in a decreasing order of relevance based on the presence of terms of the second category and, from the one or more retrieved documents, outputting one or more documents having a numeric score greater than or equal to a cut-off score.

In an embodiment of the present disclosure, classifying the set of weighted, relevant terms into first and second categories further includes ordering the terms with decreasing term weight, initializing a clustering algorithm with individual term weights, determining whether a single cluster contains the top ranked term, assigning the first category to each term when the single cluster contains the top ranked term, assigning the second category to each term when the single cluster does not contain the top ranked term, determining whether the single cluster contains more or less than N terms, assigning the second category to each term when the single cluster contains more than N terms and, if the single cluster contains less than N terms, assigning the first category to the first M terms and assigning the second category to the remaining terms.

In an embodiment of the present disclosure, the computer-implemented method further includes filtering the one or more retrieved documents according to respective timestamps.

In an embodiment of the present disclosure, the computer-implemented method further includes notifying a user about new matching documents.

In yet another aspect, an embodiment of the present disclosure seeks to provide a document stream filtering system including a receiving module operable to receive and store one or more documents of a document stream in a search index, a global document frequency module operable to calculate global document frequencies for the one or more documents of the document stream, a feature selection module operable to receive one or more reference documents from a user terminal and generate a set of relevant terms and corresponding weights using metrics of document frequencies of the one or more reference documents and the global document frequencies as well as a query term classification module operable to generate a query by classifying the set of relevant terms into first and second categories wherein a clustering algorithm is used for identifying terms for each category based on the individual term weights.

In an embodiment of the present disclosure, the document stream filtering system also includes a document retrieval module operable to retrieve one or more documents from the search index when the one or more documents contain a term of the first category and arrange the one or more documents in a decreasing order of relevance based on the presence of terms of the second category and further includes a post-processing module operable to output, from the one or more documents, one or more documents having a numeric score greater than or equal to the cut-off score.

In an embodiment of the present disclosure, the query term classification module of the document stream filtering system is operable to classify the relevant set of terms into first and second categories by: ordering the terms with decreasing term weight, initializing a clustering algorithm with individual term weights, executing the clustering algorithm to identify a single cluster which includes the top ranked term, assigning the second category to each term if the single cluster does not contain the top ranked term, assigning the second category to each term, if the single cluster contains more than N terms and assigning the first category to the first M terms if the single cluster contains less than N terms while assigning the second category to the remaining terms.

In an embodiment of the present disclosure, the post-processing module of the document stream filtering system is further operable to filter the one or more retrieved documents according to respective timestamps.

In an embodiment of the present disclosure, the post-processing module of the document stream filtering system is further operable to notify a user about new matching documents.

Further details of aspects, objects, and advantages of the disclosure are described below in the detailed description, figures, and claims. Both the foregoing general description and the following detailed description are explanatory, and are not intended to be limiting as to the scope of the disclosure.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

Figure 1:
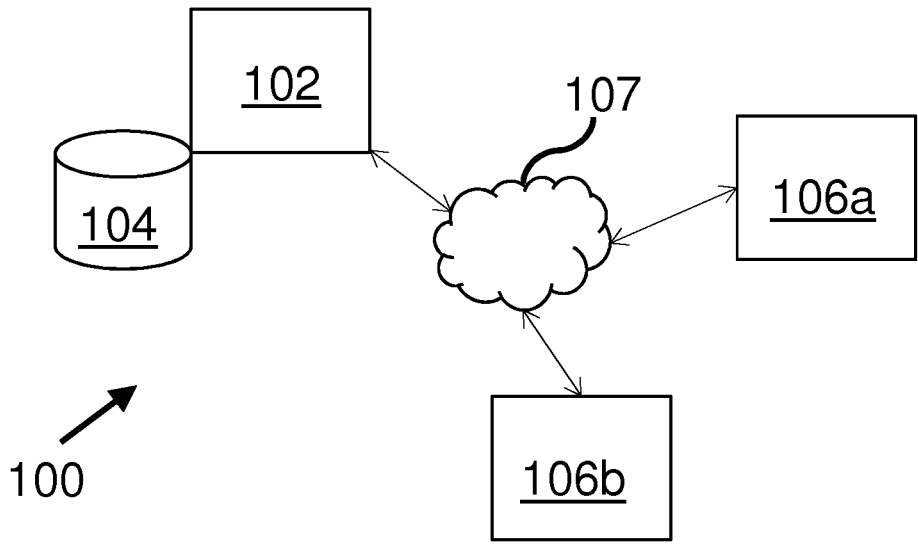
FIG. 1 is a schematic illustration of an environment, wherein various embodiments of the present disclosure can be practiced.

Information filtering systems, a variant of general information retrieval systems, remove redundant or unwanted information from an information stream prior to presenting it to a user. However, many information filtering systems such as document stream filtering systems only use document-local information (information present in the single document itself) in calculating the document relevancy and neglect to use all (previous) documents available in the stream. Further, some systems use an unranked Boolean retrieval model (a document either matches a filter or it does not) to remove unwanted documents from the information stream. One known system uses a statistical model based on inverted lists of terms to improve filtering precision. Since existing systems are not efficient at filtering out unwanted documents from a document stream, a need exists for a document stream filtering system that efficiently filters out unwanted documents from a document stream, and that overcomes the limitations of the existing document stream filtering systems.

The following detailed description illustrates embodiments of a document stream filtering system, a computer implemented method for document stream filtering and manners by which the same can be implemented. Although the best mode of carrying out the present disclosure has been disclosed, those skilled in the art would recognize that other embodiments for carrying out or practicing the present disclosure are also possible.

Embodiments of the document stream filtering system includes computing hardware which is operable to execute one or more software products recorded on machine-readable data storage media. The computing hardware is operable to receive one or more documents of a document stream.

Received documents are converted to a textual representation by extracting the corresponding information from the documents and storing in a search index. Unwanted content is removed from the extracted information before storing in a search index. Global document frequencies are calculated for the one or more documents of the document stream stored in the search index.

Moreover, the system is operable to receive one or more reference documents, generate a set of relevant terms and corresponding weights using metrics of document frequencies of the one or more reference documents and the global document frequencies. In addition, the system is operable to generate a query by classifying the relevant terms into first and second categories, wherein a clustering algorithm is used for identifying terms for each category based on the individual term weights.

The system is further operable to retrieve one or more documents from the search index based on a user query, wherein a retrieved document must contain a term of the first category. The one or more retrieved documents are arranged in a decreasing order of relevance based on the presence of terms of the first and second category. The one or more retrieved documents are filtered based on a cut-off score, wherein the filtered documents have a numeric score greater than or equal to the cut-off score.

Embodiments of the present disclosure substantially eliminate, or at least partially address, problems in the prior art, enabling the user to filter out the unwanted documents from a document stream.

Referring now to drawings, particularly by their reference numbers, FIG. 1 is an illustration of an environment 100, wherein various embodiments of the present disclosure can be practiced. The environment 100 includes an information filtering system 102, at least one database 104, and one or more user devices 106*a* and 106*b*, wherein the information filtering system 102, the database 104, and the one or more user devices 106*a* and 106*b* (also referred to herein as user terminals) are communicatively coupled to each other via a communication network 107. Examples of the communication network 107 include, but are not limited to, Internet, Intranet, MAN, LAN, and WAN.

The user devices 106*a* and 106*b* (hereinafter collectively referred to as user devices 106) are generally representative of user computing devices such as personal computer, laptop, personal digital assistant, tablets, phablets, webpad, wearable computers, mobile telephone, wrist-worn computers, smart phones or any other device capable of displaying a web-based interface or using an application programming interface (API). The database 104 stores a plurality of documents, images, videos, figures, scripts pertaining to a variety of topics such as finance, literature, science, healthcare, legal, etc.

The information filtering system 102 has access to the database 104 and generally includes one or more servers that serve data to the user devices 106, in the form of webpages that may include redirects and other Hypertext markup language (HTML) information such as text, figures, videos, images, and scripts. In an embodiment, the information retrieval system 102 receives a data stream directed towards a user device 106*a*, filters the data stream and displays the filtered data on the user device 106.

FIG. 1 is merely an example. One of ordinary skill in the art would recognize many variations, alternatives, and modifications of embodiments herein.

Figure 2:
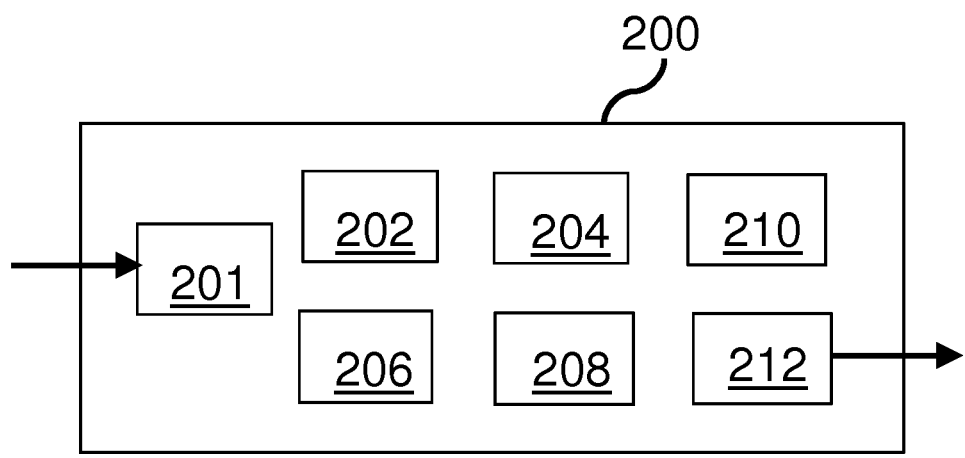
FIG. 2 is a schematic illustration of a document stream filtering system, which is an example of an information filtering system, in accordance with an embodiment of the present disclosure.

FIG. 2 is a schematic illustration of a document stream filtering system 200, which is an example of the information filtering system 102, in accordance with an embodiment of the present disclosure. The document stream filtering system 200 includes a receiving module 201, a search index 202, a global document frequency (GDF) module 204, a feature selection module 206, a query term classification module 208, a document retrieval module 210, and a post-processing module 212.

The receiving module 201 receives a document stream directed towards the user device 106*a*. Received documents are converted to a textual representation by extracting the textual information from the documents. The conversion process is done using a suitable document converter. Suitability is determined by using document file extension heuristics, declared document content types, and by looking at special patterns of bytes near the start of the document. The receiving module 201 segments the textual representation into individual blocks and the individual blocks are classified as valuable content or undesired content. The receiving module 201 stores only valuable content in the search index 202. In an embodiment, the receiving module 201 may receive the document stream from another user device 106b or a web server, or may access the document stream from the database 104.

Figure 3:
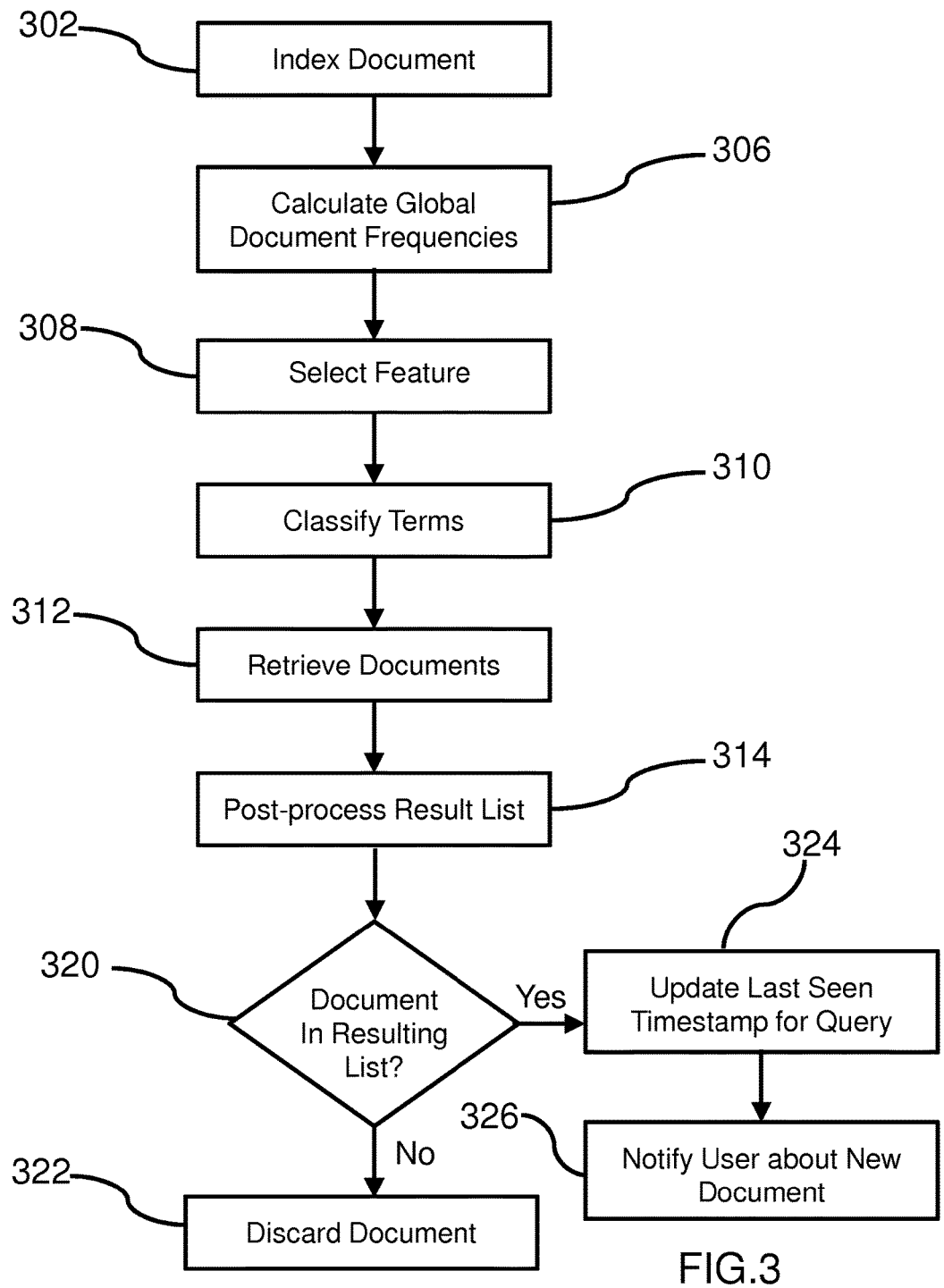
FIG. 3 is a schematic illustration of a process of filtering of documents by a document stream filtering system, in accordance with the present disclosure.

FIG. 3 is a schematic illustration of a process of filtering documents by the document stream filtering system 200, in accordance with the present disclosure. At step 302, the receiving module 201 (FIG. 2) receives a new document of the document stream, converts and indexes the new document, and stores the same in the search index 202. Then, at step 306, the GDF module 204 generates a latest version GDFS$_{vi}$ of the global document frequencies of the document stream based on the new document. At step 308, the feature selection module 206 receives one or more reference documents from the user and the latest version GFDS$_{vi}$ from the GDF module 204, and calculates terms and weights for generating a query. At step 310, the query term classification module 208 forms a query by classifying the terms into different categories based on their weight. At step 312, the document retrieval module 210 retrieves one or more documents from the search index 202 based on the query. At step 314, the post-processing module 212 post-processes the one or more documents based on a cut-off score and a last seen time-stamp, to generate a final list of documents. Then at step 320, the post-processing module 212 checks whether a document of the document stream is in the final list. If the document is not in the final list, it is discarded at step 322, else last seen timestamp is updated for the query at step 324 and the user is notified about the new document at step 326.

Figure 4:
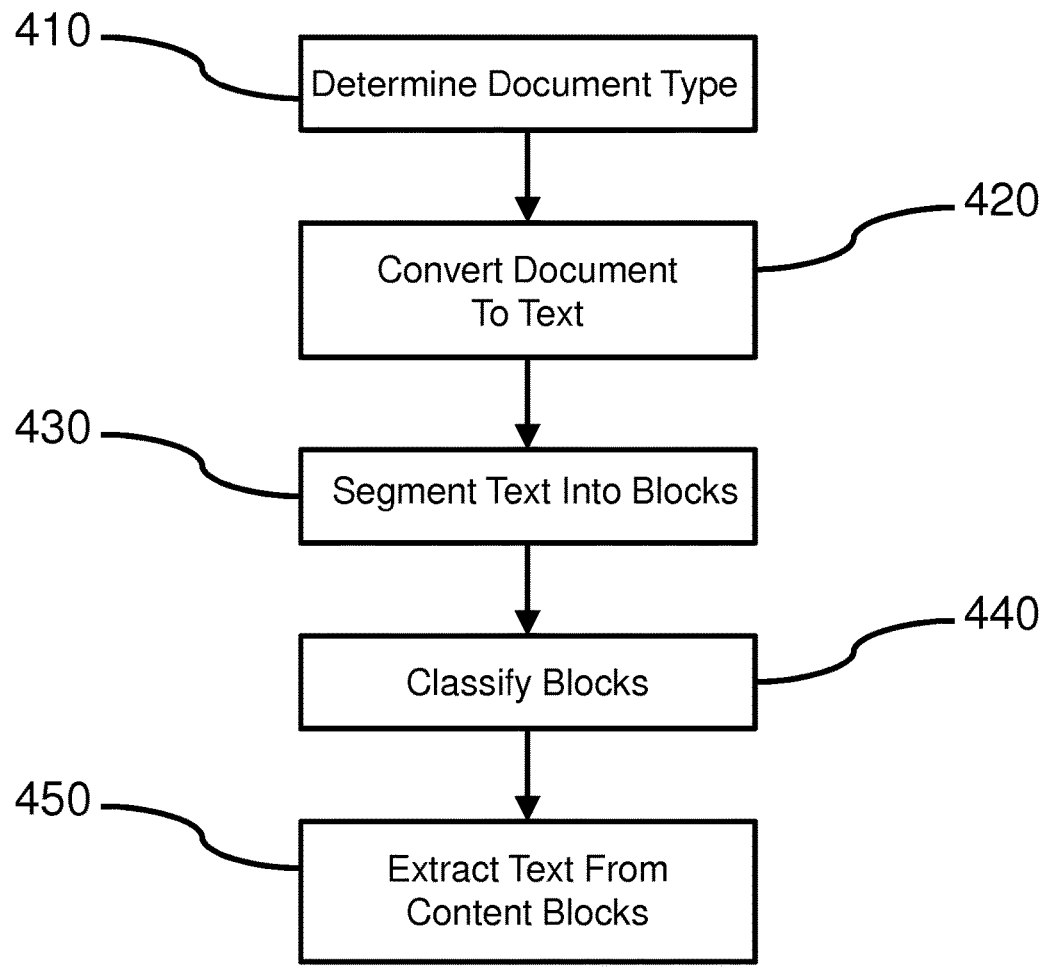
FIG. 4 is a schematic illustration of a process of extracting text components of documents by the document stream filtering system, in accordance with the present disclosure.

FIG. 4 is a schematic illustration of a process of extracting text components of the documents by the receiving module 201 (FIG. 2), in accordance with the present disclosure. At step 410, the receiving module 201 receives a new document and determines the document type. At step 420 the receiving module 201 uses the determined document type to convert the received document into a textual representation. At step 430, the receiving module 201 segments the textual representation into individual blocks. Segmentation may be performed by any of a variety of techniques including but not limited to looking at paragraph separators such as new lines or HTML tags. At step 440, the receiving module 201 classifies individual blocks into valuable content or undesired content. Classification is performed using block attributes such as, for example, text length, stopword density, and character link density. At step 450, text is extracted from content blocks.

Figure 5:
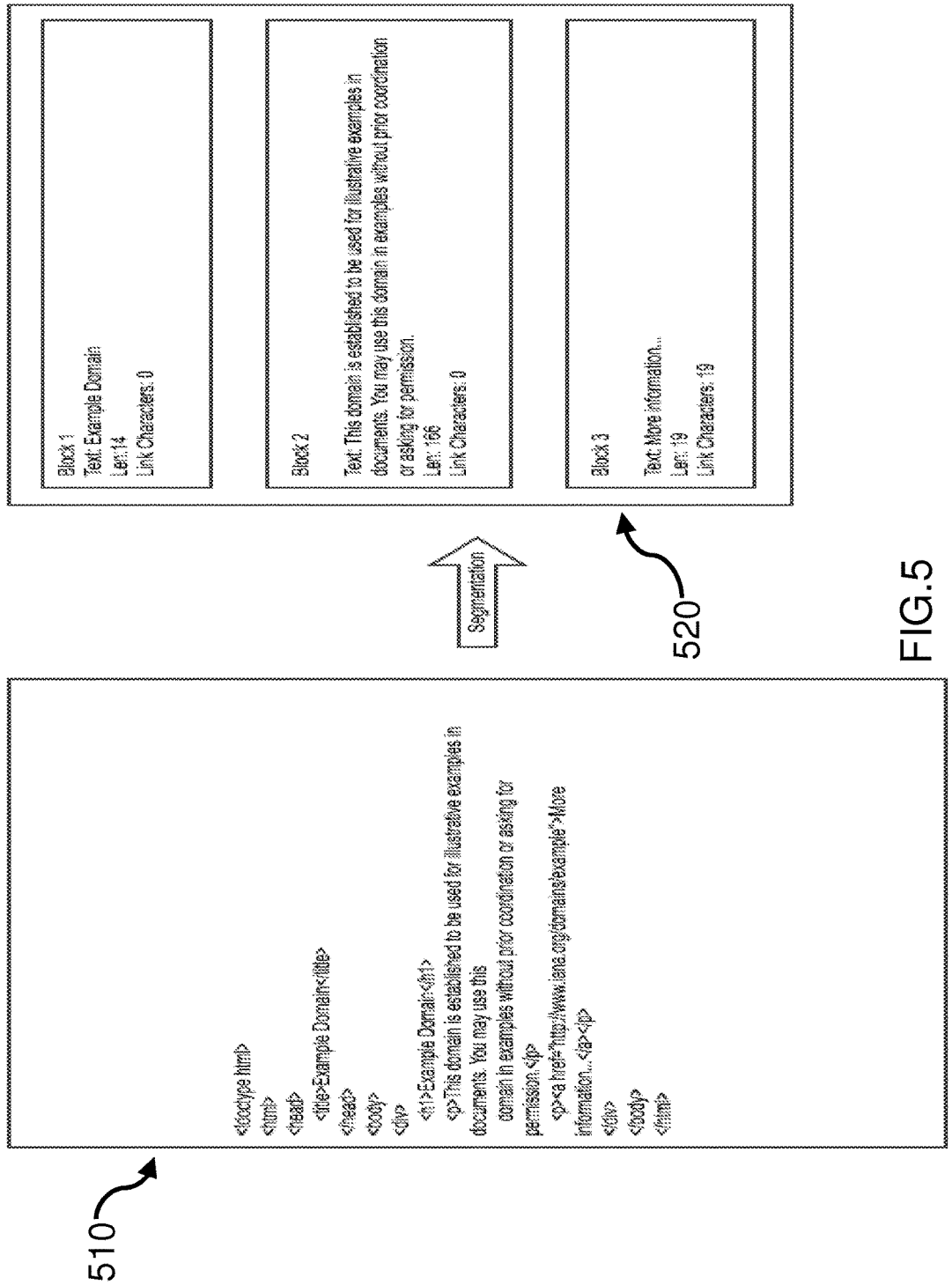
FIG. 5 is an example segmentation of document text into text blocks by the text extraction module, in accordance with the present disclosure.

FIG. 5 is an example segmentation of document text into text blocks by the receiving module 201 (FIG. 2), in accordance with the present disclosure. The textual representation 510 is segmented into individual blocks 520 by using the embedded HTML tags. The receiving module 201 calculates individual block attributes such as text length and character link density.

Figure 6:
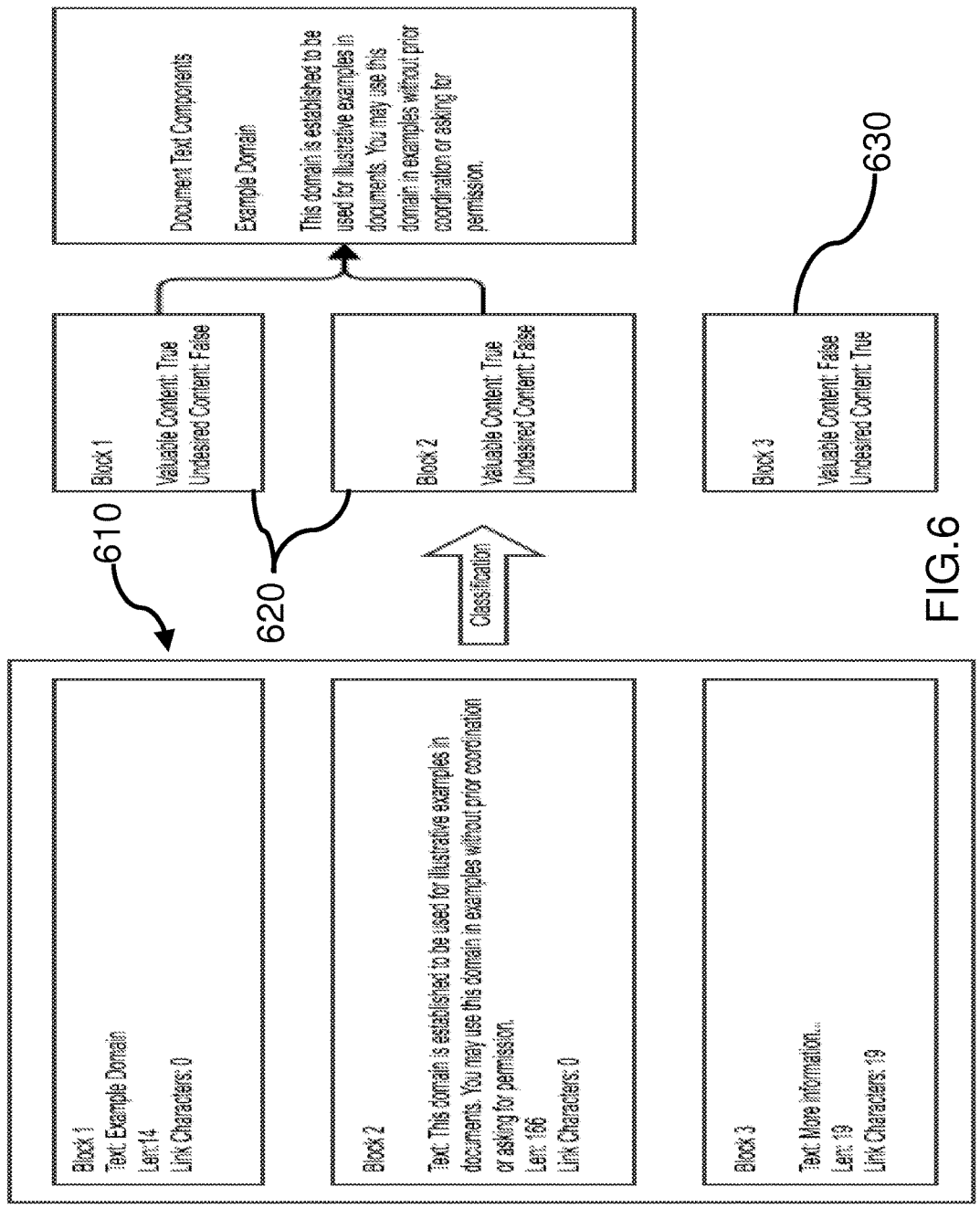
FIG. 6 is an example classification of document text blocks by the text extraction module, in accordance with the present disclosure.

FIG. 6 is an example classification of document text blocks by the receiving module 201 (FIG. 2), in accordance with the present disclosure. The individual blocks 610 are classified into valuable content and undesired content by using calculated block attributes such as text length and character link density. Valuable content blocks 620 are identified to be the document text components while 630 represents an undesired block. The search index 202 stores the document text components determined by the receiving module 201.

The GDF module 204 calculates the global document frequencies (knowledge about term counts in all documents of the stream) for all incoming documents of the document stream. Incoming documents are converted to a textual representation by extracting the corresponding information from the documents. The GDF module 204 segments the textual representation into individual blocks. Individual blocks are classified to be valuable content or undesired content. The GDF module 204 uses only valuable content to determine the textual vocabulary, which is determined by tokenizing the document text parts into terms, optionally dropping common terms, normalizing terms (e.g. case-folding), and term stemming or lemmatization. Each such step in determining the textual vocabulary is language specific. For each new incoming document, the GDF module 204 generates a new version (GDFS$_i$) of the global document frequencies based on a previous version (GDFS$_{i-1}$) of the global document frequencies.

Figure 7:
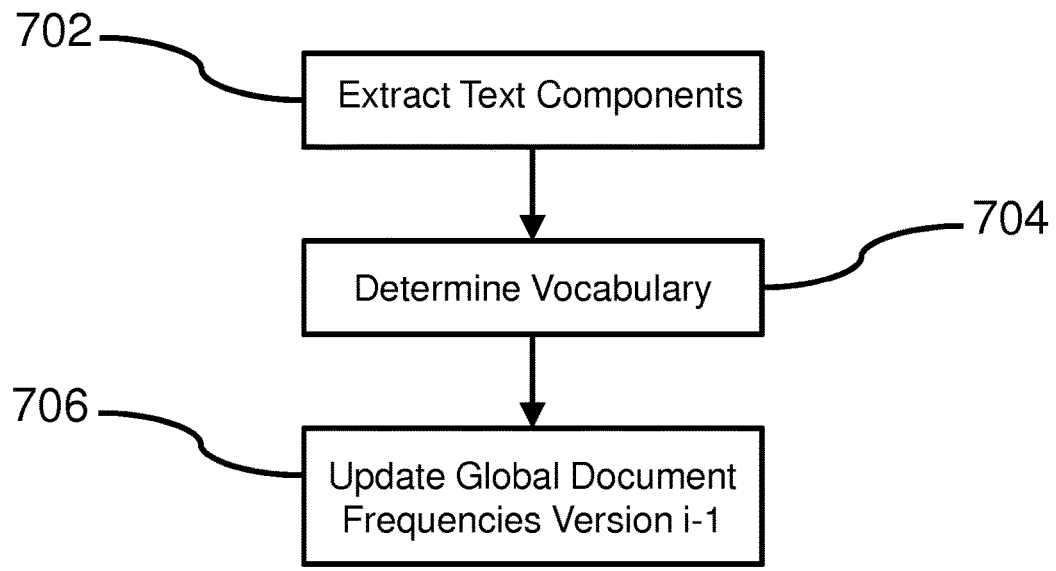
FIG. 7 is a schematic illustration of a process of calculating global document frequencies (GDF) by the GDF module, in accordance with the present disclosure.

FIG. 7 is a schematic illustration of a process of calculating global document frequencies by the GDF module 204 (FIG. 2), in accordance with the present disclosure. At step 702, the GDF module 204 receives a new document, and extracts text components therefrom. Text components may be determined by establishing the new document type, converting the document to text, segmenting the text into blocks, classifying blocks into either valuable content or undesired content, and extracting text from valuable content blocks. At step 704, the GDF module 204 determines vocabulary of the text components, which may be accomplished by tokenizing the textual components into terms, dropping common terms, normalizing terms (e.g. case-folding), and term stemming or lemmatization. At step 706, the GDF module 204 updates a previous version of the global document frequencies GDFS$_{i-1}$ based on the vocabulary determined at step 704, to generate an updated version of the global document frequencies GDFS$_i$.

Figure 8:
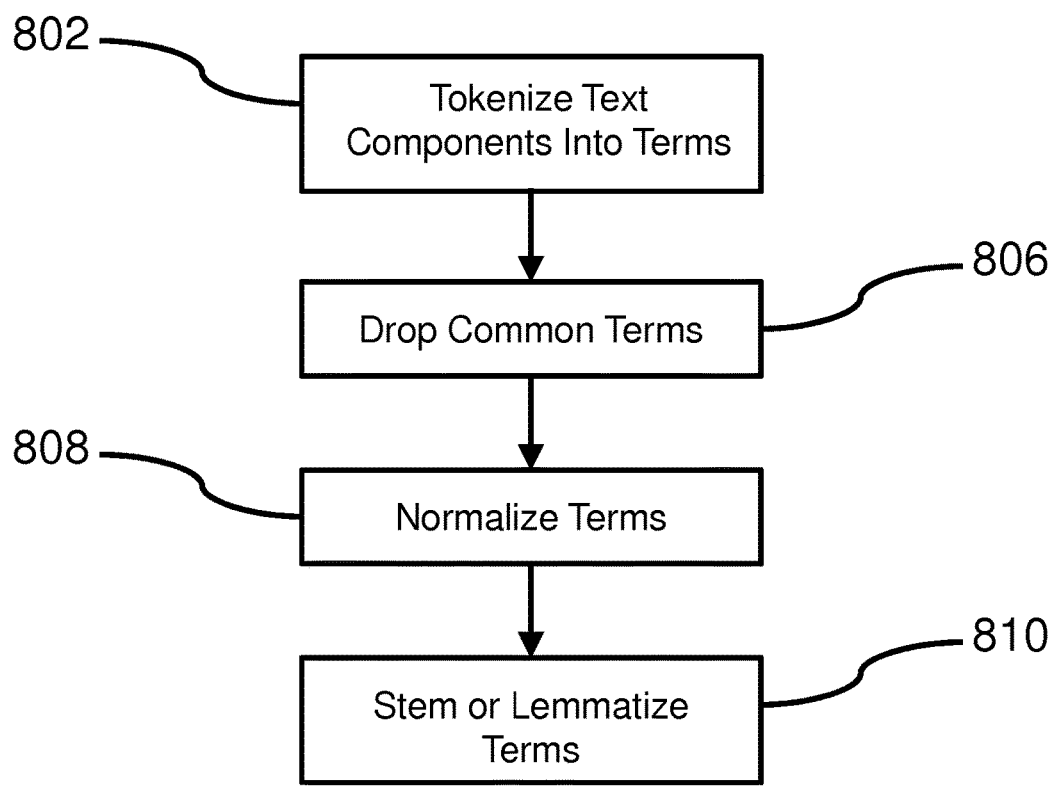
FIG. 8 is a schematic illustration of a process of determining textual vocabulary, in accordance with the present disclosures.

FIG. 8 is a schematic illustration of the process of determining language specific textual vocabulary, in accordance with the present disclosure. At step 802, one or more text components may be tokenized into a set of terms, out of which one or more common terms may be dropped at step 806. The remaining terms may be normalized at step 808, and stemmed or lemmatized at step 810, to generate a vocabulary of terms. The process of FIG. 8 may be used in conjunction with embodiments of a process of calculating global document frequencies such as that described with respect to FIG. 7.

The feature selection module 206 (FIG. 2) calculates a feature selection metric based on one or more reference documents and a latest version of the GDFS$_i$. The reference documents are a formal statement of information need provided by the user. They may include previous documents from the document stream (stream-internal reference documents, e.g. individual entries in an ever updating rich site summary feed) and/or arbitrary documents from any other system (stream-external reference documents, e.g. web pages, .pdf documents).

The feature selection module 206 converts the one or more reference documents to a textual representation by extracting the corresponding information from the reference documents. The feature selection module 206 segments the reference documents textual representation into individual blocks. Individual blocks are classified to be valuable content or undesired content. The feature selection module 206 uses only valuable content from reference documents to determine the textual vocabulary (also known as terms).

The feature selection module 206 uses the metrics of document frequencies (document-local knowledge about term counts in the reference documents) and global document frequencies (knowledge about term counts in all documents of the stream, including reference documents) to extract individual terms and the corresponding weights from reference documents. Both metrics are solely based on statistical knowledge and do not use any form of manual or semi-automatic pre-classification of individual terms. In an embodiment, the feature selection module 206 assigns a numerical value for a particular feature selection metric to each term, where the value of the feature selection metric is the term weight. Examples of feature selection metrics include, but are not limited to, Chi-Squared, Information Gain, Odds Ratio, (Log) Probability Ratio, and Document Frequency. The feature selection module 206 orders terms by relevance, i.e. by decreasing term weight, and identifies the top k terms for generating a query.

Figure 9:
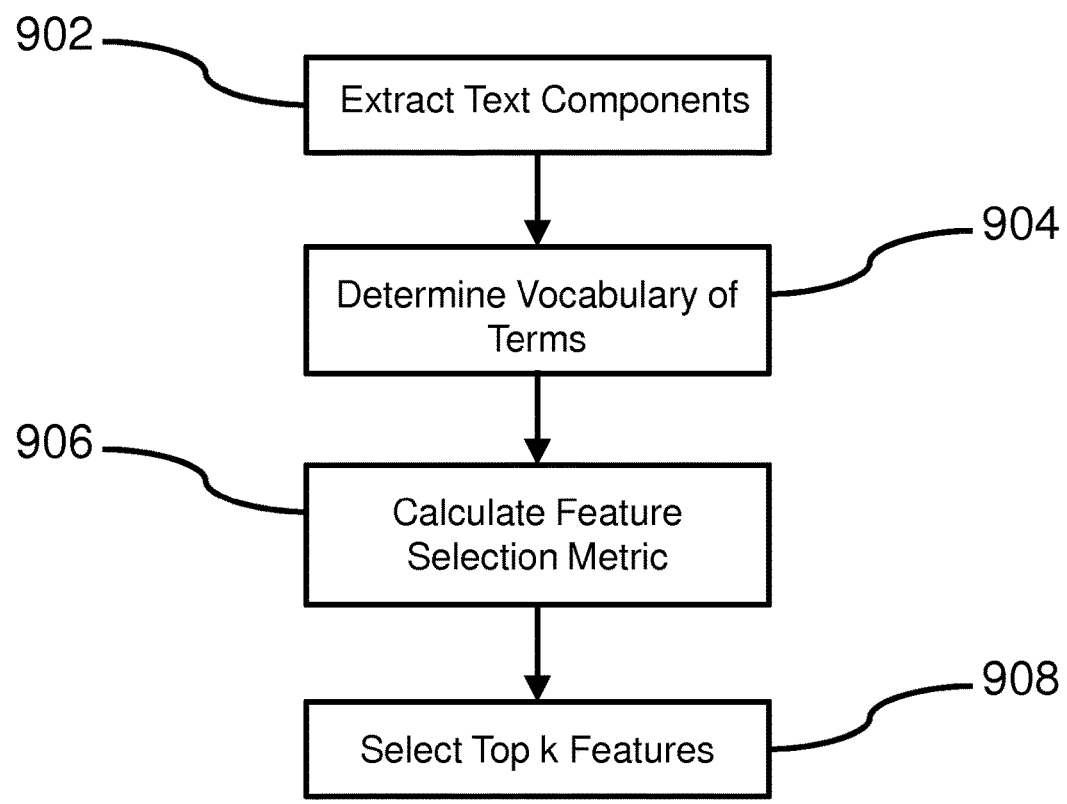
FIG. 9 is a schematic illustration of a process of feature selection by the feature selection module, in accordance with the present disclosure.

FIG. 9 is a schematic illustration of a process of feature selection by the feature selection module 206 (FIG. 2), in accordance with the present disclosure. At step 902, the feature selection module 206 extracts text components from one or more reference documents. Text components may be determined by establishing the reference document type, converting the document to text, segmenting the text into blocks, classifying blocks into either valuable content or undesired content, and extracting text from valuable content blocks. At step 904, the feature selection module 206 determines the vocabulary of the text components. At step 906, the feature selection module 206 calculates a feature selection metric based on the vocabulary and the latest version of the global document frequencies $GDFS_i$. At step 908, the feature selection module 206 identifies the top k terms and corresponding weights to generate a query based on the reference documents.

The process of FIG. 9 may be used in conjunction with embodiments of a process of extracting text from documents such as that described with respect to FIG. 4.

The query term classification module 208 classifies the top k terms and the corresponding feature selection metric values into two categories:

'must' category: A document must contain the term
'should' category: A document should contain the term The query term classification module 208 uses a clustering algorithm (e.g. K-means) to identify terms for each category based on the individual term weights.

Figure 10:
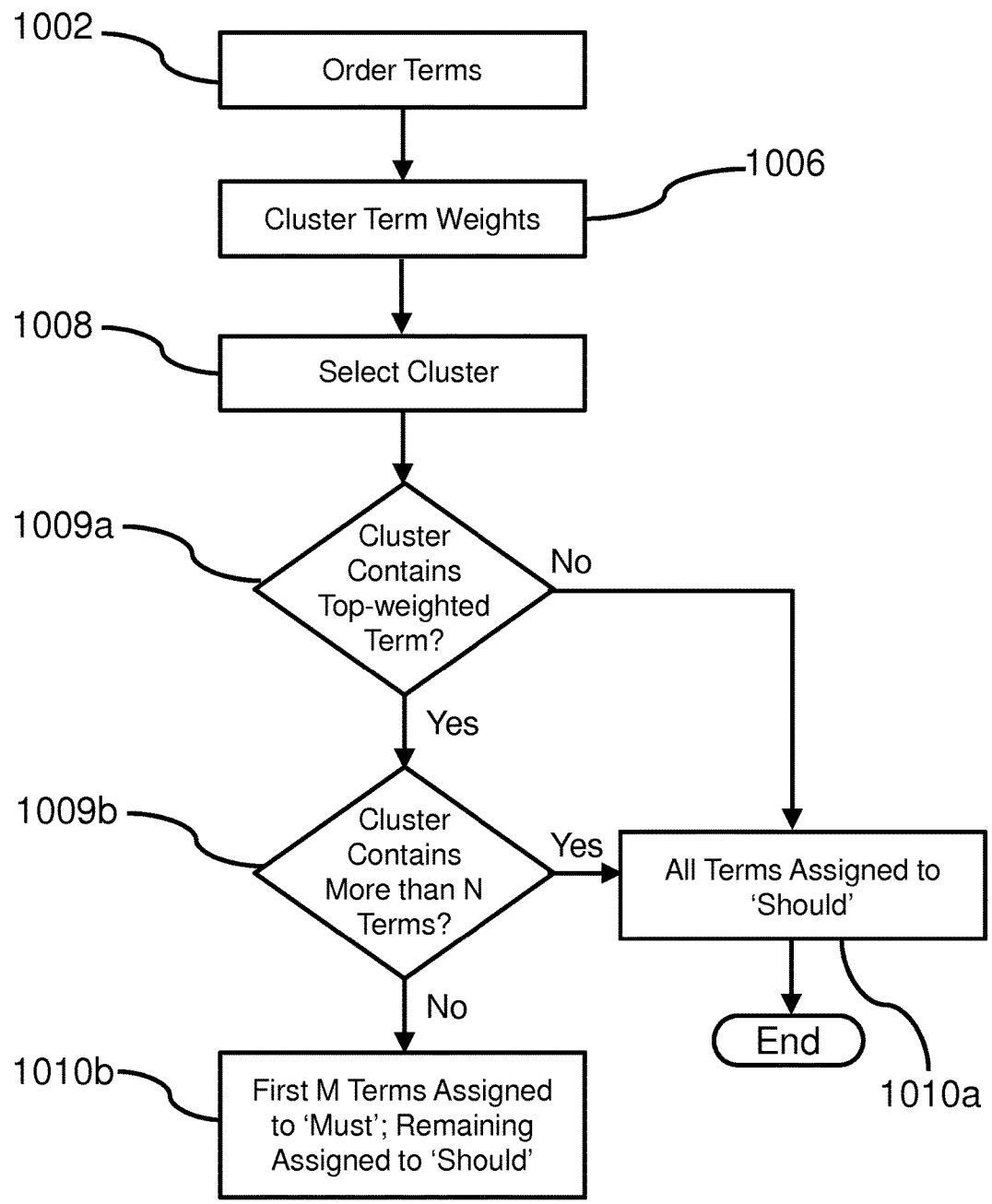
FIG. 10 is a schematic illustration a process of term classification by the query term classification module, in accordance with the present disclosure.

FIG. 10 illustrates an algorithm which may be used by the query term classification module as part of a term classification process, in accordance with the present disclosure. At step 1002, the query term classification module 208 (FIG. 2) orders terms in decreasing order of their weight. At step 1006, module 208 initializes a clustering algorithm with individual term weights and clusters term weights based on the clustering algorithm. At step 1008, the query term classification module 208 selects the cluster which contains the top-weighted term by executing the clustering algorithm. Module 208 determines, at step 1009a, whether a cluster is selected and contains the top-weighted term. If no cluster is selected or if the selected cluster does not contain the top-weighted term, all terms are labeled or assigned to 'should' at step 1010a and the algorithm ends. If the selected cluster does contain the top-weighted term, module 208 determines whether the cluster contains more than N terms at step 1009b. If the cluster does contain more than N terms (larger than N), all terms are assigned to 'should' as with step 1010a. If the cluster does not contain more than N terms (less than or equal to N), the first M terms are assigned to 'must' at step 1010b while the remaining terms, including the terms from all other clusters, are assigned to 'should'. The 'must' and 'should' terms, and the corresponding term weights form an input query based on the reference documents. The input query is machine generated and is used to evaluate the similarity of individual documents, compared to all documents in the stream.

Figure 11:
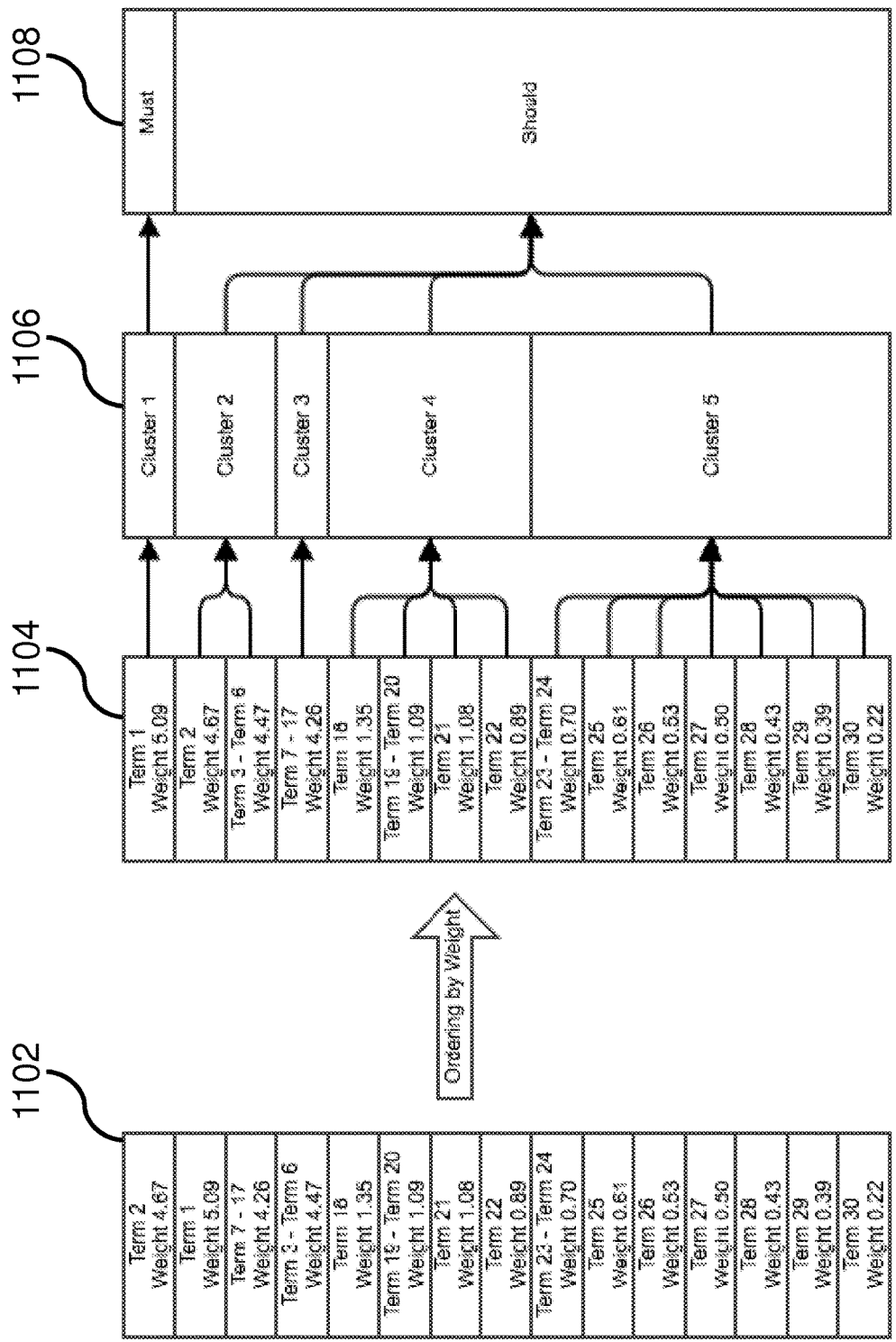
FIG. 11 is an example classification of terms by the query term classification module, in accordance with the present disclosure.

FIG. 11 is an example schematic illustration of a process of classification of terms by the query term classification module 208 (FIG. 2), in accordance with the present disclosure. The set of terms 1102 are placed into an arrangement 1104 of decreasing order by weight, and one or more terms are clustered based on their weight to form a set 1106 of clusters 1, 2, 3, 4 and 5. The cluster 1 includes the top-ranked term 1 and therefore, the term 1 is assigned to the 'must' category, and terms of the remaining other clusters 2,3,4 and 5 are assigned to the 'should' category. The 'must' and 'should' terms along with their weight form a query 1108 for document stream filtering.

The document retrieval module 210 uses the query generated by the query term classification module 208 for score-based retrieval of documents from the search index 202. As per query, all 'must' terms are required to be in the documents retrieved. This may reduce the number of documents to be considered by many orders of magnitude. Further, all 'must' and 'should' terms influence the relevancy score of each remaining document. The document retrieval module 210 generates a list of documents arranged in a decreasing order of relevance, corresponding numerical scores, and total number of results.

The post-processing module 212 filters the list of documents generated by the document retrieval module 210 based on a cut-off score. In an embodiment, the post-processing module 212 outputs only those documents that have a numerical score greater than or equal to the cut-off score, and discards those that remain. In another embodiment of the present disclosure, the post-processing module 212 filters the list of documents based on a last-seen timestamp variable, and outputs only those documents with a creation timestamp newer than the last-seen timestamp variable (FIG. 3). Output of processing module 212 may be, for example, to user terminals 106.

In various embodiments of the present disclosure, the document stream filtering system 200 taps into document information streams and assigns a creation timestamp value to all documents. If required, the last-seen timestamp for the machine generated query is updated to the timestamp of the query execution. Also, the system 200 continuously incorporates new documents in the stream to calculate the global document frequencies, allowing the system to reflect any statistical changes in the stream and provide robust query generation based on the user provided reference documents.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A document stream filtering system, wherein the document stream filtering system includes computing hardware which is operable to execute one or more software products recorded on machine-readable data storage media in order to:
   receive and store one or more documents of a document stream in a search index;
   calculate global document frequencies for the one or more documents of the document stream;
   receive from a user terminal, one or more reference documents;
   generate a set of relevant terms and corresponding weights, using metrics of document frequencies of the one or more reference documents and the global document frequencies;
   generate a query by classifying the set of relevant terms into first and second categories using a clustering algorithm to identify terms for each category based on the individual term weights by:
      ordering the terms with decreasing term weight;
      initializing a clustering algorithm with individual term weights;
      executing the clustering algorithm to determine whether a single cluster includes the top ranked term;
      assigning the second category to each term if the single cluster does not contain the top ranked term;
      assigning the second category to each term, if the single cluster contains more than N terms; and
      assigning the first category to the first M terms, if the single cluster contains less than N terms, and assigning the second category to the remaining terms;
   retrieve one or more documents from the search index when the one or more documents contain a term of the first category;
   arrange the one or more retrieved documents in a decreasing order of relevance based on the presence of terms of the second category; and
   filter the one or more retrieved documents based on a cut-off score and a last-seen timestamp variable, wherein the filtered documents have a numeric score greater than or equal to the cut-off score and with a creation timestamp newer than the last-seen timestamp variable.

2. The document stream filtering system as claimed in claim 1, wherein the operability to execute one or more software products recorded on machine-readable data storage media in order to cause a query to be generated further includes operability to generate the input query by machine and evaluate the similarity of individual documents, compared to all documents in the stream.

3. The document stream filtering system as claimed in claim 1, wherein the computing hardware is further operable to execute one or more software products recorded on machine-readable data storage media in order to notify a user about new matching documents.

4. The document stream filtering system as claimed in claim 1, wherein the user terminal is implemented using at least one of: a personal computer, a laptop, a personal digital assistant, a tablet, a phablet, a webpad, a wearable computer, a mobile telephone, a wrist-worn computer, and a smart phone.

5. The document stream filtering system as set forth in claim 1, wherein the computing hardware is further operable to execute one or more software products recorded on machine-readable data storage media in order to cause extraction of valuable content text.

6. The document stream filtering system as claimed in claim 5, wherein the operability to execute one or more software products recorded on machine-readable data storage media in order to cause extraction of valuable content text further includes operability to:
   determine the document type; and
   convert the document to text using the document type and a suitable converter component.

7. The document stream filtering system as claimed in claim 5, wherein the operability to execute one or more software products recorded on machine-readable data storage media in order to cause the extraction of valuable content text further includes operability to:
   segment the document text into text blocks;
   classify text blocks into valuable content and undesired content; and
   extract text from valuable content blocks.

8. A computer-implemented method for document stream filtering, comprising:
   receiving and storing one or more documents of a document stream in a search index;
   calculating global document frequencies for the one or more documents of the document stream;
   receiving one or more reference documents from a user terminal;
   generating a set of weighted, relevant terms from document frequency metrics of both the reference documents and the global documents;
   generating an input query by classifying the set of weighted, relevant terms into first and second categories based on individual term weights by:
      ordering the terms with decreasing term weight;
      initializing a clustering algorithm with individual term weights;
      determining whether a single cluster contains the top ranked term;
      assigning the second category to each term if the single cluster does not contain the top ranked term;
      determining whether the single cluster contains more or less than N terms when the single cluster contains the top ranked term;
      assigning the second category to each term, if the single cluster contains more than N terms; and
      assigning the first category to the first M terms, if the single cluster contains less than N terms, and assigning the second category to the remaining terms;
   retrieving one or more documents from the search index when the one or more documents contain a term of the first category;
   arranging the one or more retrieved documents in a decreasing order of relevance based on the presence of terms of the second category; and
   filtering the one or more retrieved documents based on a cut-off score and a last-seen timestamp variable, wherein the filtered documents have a numeric score greater than or equal to the cut-off score and with a creation timestamp newer than the last-seen timestamp variable.

9. The computer-implemented method as set forth in claim 8, further comprising notifying a user about new matching documents.

10. A document stream filtering system, comprising:
   a receiving module operable to receive and store one or more documents of a document stream in a search index;

a global document frequency module operable to calculate global document frequencies for the one or more documents of the document stream;

a feature selection module operable to receive one or more reference documents from a user terminal and generate a set of relevant terms and corresponding weights using metrics of document frequencies of the one or more reference documents and the global document frequencies;

a query term classification module operable to generate a query by classifying the set of relevant terms into first and second categories, wherein a clustering algorithm is used for identifying terms for each category based on the individual term weights by:

ordering the terms with decreasing term weight;

initializing a clustering algorithm with individual term weights;

determining whether a single cluster contains the top ranked term;

assigning the second category to each term if the single cluster does not contain the top ranked term;

determining whether the single cluster contains more or less than N terms when the single cluster contains the top ranked term;

assigning the second category to each term, if the single cluster contains more than N terms; and assigning the first category to the first M terms, if the single cluster contains less than N terms, and assigning the second category to the remaining terms;

a document retrieval module operable to retrieve one or more documents from the search index when the one or more documents contain a term of the first category, arrange the one or more retrieved documents in a decreasing order of relevance based on the presence of terms of the second category; and a post-processing module operable to filter the one or more retrieved documents based on a cut-off score and a last-seen timestamp variable, wherein the filtered documents have a numeric score greater than or equal to the cut-off score and with a creation timestamp newer than the last-seen timestamp variable.

11. The document stream filtering system as set forth in claim 10, further comprising:

a document retrieval module operable to retrieve one or more documents from the search index when the one or more documents contain a term of the first category and arrange the one or more documents in a decreasing order of relevance based on the presence of terms of the second category; and a post-processing module operable to output, from the one or more documents, one or more documents having a numeric score greater than or equal to the cut-off score.

12. The document stream filtering system as claimed in claim 11, wherein the post-processing module is further operable to notify a user about new matching documents.

* * * * *